United States Patent

Sorensen

[15] 3,688,496
[45] Sept. 5, 1972

[54] COMBUSTION TYPE POWER PLANT HAVING DUAL FUNCTION CYLINDRICAL ROTOR AND STEAM INJECTION

[72] Inventor: George C. Sorensen, 589 S.E. 4th St., Ontario, Oreg. 97914

[22] Filed: March 17, 1971

[21] Appl. No.: 125,128

Related U.S. Application Data

[63] Continuation-in-part of Ser. No. 825,131, May 12, 1969, Pat. No. 3,572,037.

[52] U.S. Cl. ............. 60/39.36, 60/39.43, 60/39.59, 417/350, 60/39.75
[51] Int. Cl. .................................................. F02c 3/04
[58] Field of Search....60/39.36, 39.43, 39.59, 39.75; 417/350

[56] References Cited

UNITED STATES PATENTS

| | | | |
|---|---|---|---|
| 2,668,413 | 2/1954 | Gilberty | 60/39.36 |
| 2,454,738 | 11/1948 | Hawthorne | 60/39.36 |
| 2,543,864 | 3/1951 | Melenric | 60/39.36 |
| 2,925,714 | 2/1960 | Cook | 60/39.36 |
| 3,321,912 | 5/1967 | Oprecht | 60/39.36 |

Primary Examiner—Carlton R. Croyle
Assistant Examiner—Warren Olsen
Attorney—David V. Trask, C. Harvey Gold and William S. Britt

[57] ABSTRACT

A novel compact internal combustion turbine prime mover is disclosed. The turbine comprises a cylindrical housing, a centrifugal impeller at one or both ends thereof, a cylindrical air compressor which is concentric about and is attached to a cylindrical power turbine. An internal combustion chamber is located within the cylindrical power turbine and exhausts combustion gases into helically disposed vanes of said power turbine which results in rotation of said power turbine, which causes rotation of the cylindrical air compressor and the centrifugal impeller.

10 Claims, 5 Drawing Figures

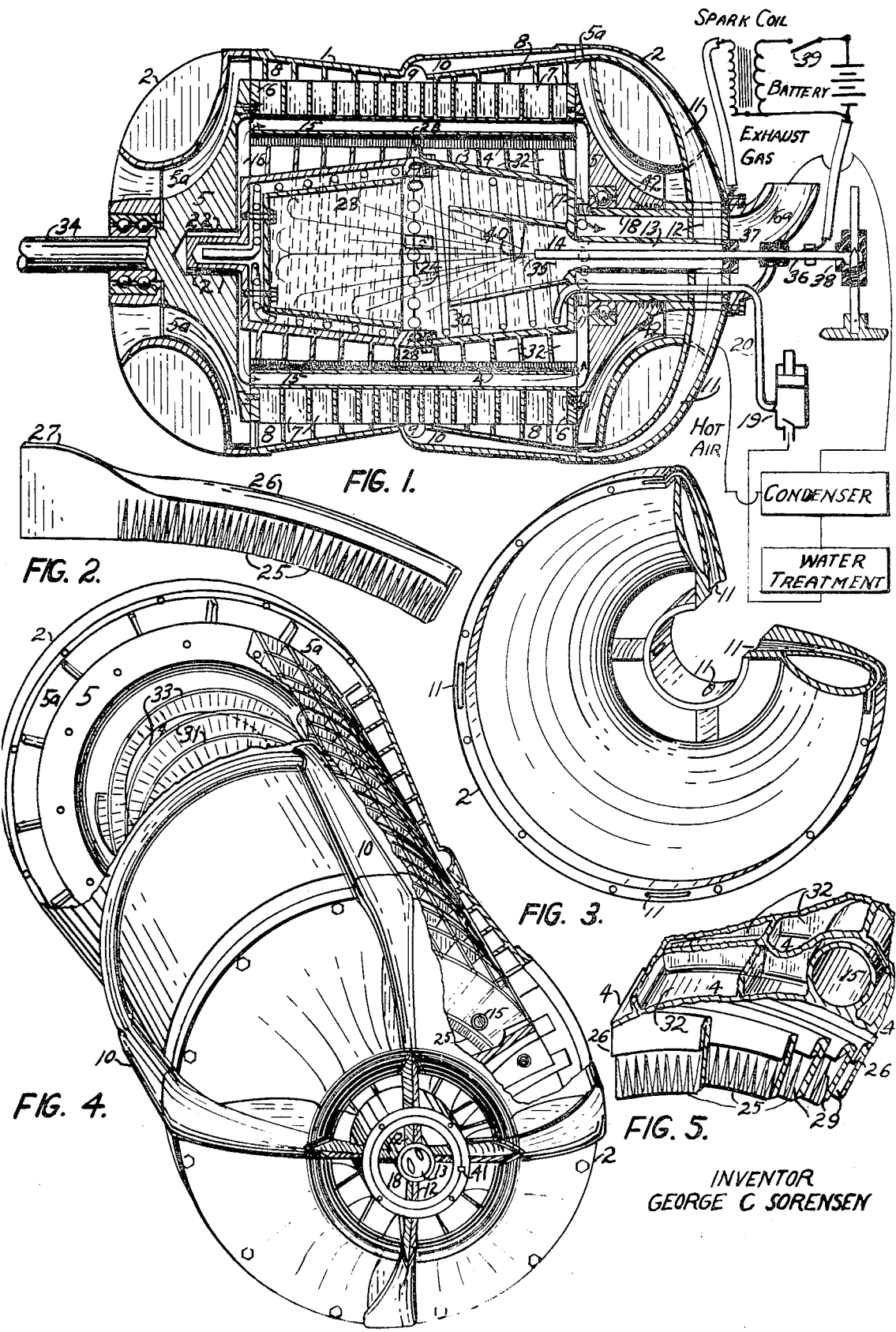

COMBUSTION TYPE POWER PLANT HAVING DUAL FUNCTION CYLINDRICAL ROTOR AND STEAM INJECTION

RELATED APPLICATIONS

This application is a continuation-in-part of my application Ser. No. 825,131, filed May 12, 1969, now U.S. Pat. No. 3,572,037.

BACKGROUND OF THE INVENTION

The conventional parallel flow internal combustion turbine has pressurized gas passed through inclined blades or buckets precisely mounted in stationary housing segments and on related rotors. Because the pressurized gas travels such a short path through such a turbine, it is necessary to cause said turbine to rotate at very high speeds in order to extract a substantial portion of the energy from said gas. The extremely high speeds of rotating blades require high cost metal alloys that will withstand the centrifugal force and heat, yet conform to careful machining and close tolerances required in maintaining proper relation with similarly constructed stationary blades. Also, in the event the turbine is to be used in road, rail, boat or propeller driven aircraft, elaborate gears and bearing systems must be used to reduce the speed for proper energy utilization. Furthermore, the main rotor bearings of such turbines suffer from constant exposure to extremely high temperatures.

OBJECTS OF THE INVENTION

It is a primary object of the present invention to provide a turbine which operates at much lower than conventional speed and whose revolving parts subjected to elevated temperatures are centrifugally forced against their base rather than stretched away from it. A further object is to provide a turbine of light weight, high torque and a compact design which fits into streamlined structures.

It is a further object to provide a turbine creating substantially pollution-free or reduced exhaust emissions by utilizing reclaimed water, compounded by combustion, to cool bearings and to cool exhaust temperatures and to provide a particle nucleus for further capturing and condensing pollutants from products of combustion.

It is a further object of this invention to provide a turbine whose expanding gas travels much farther through equally balanced left and right helical grooves formed on the immediate outside circumference of the furnace beginning at the longitudinal mid-point thereof and winding left and right in ever deepening channels to its two exhaust ends.

It is a further object of this invention to provide a turbine capable of being constructed in part from stainless steel stampings and fabricated parts.

Other objects and advantages of the invention will appear from the following description of a preferred embodiment.

SUMMARY OF THE INVENTION

The instant invention relates to an improved internal combustion turbine. The turbine comprises a cylindrical housing having substantially closed ends with a centrifugal impeller located at at least one end thereof to draw in air for the air compressor which has a cylindrical rotor unit which has vanes disposed about the periphery thereof which coact with stationary vanes disposed about the internal periphery of said housing.

A cylindrical power turbine unit is disposed concentrically within and fixedly attached to said air compressor and to said centrifugal impeller. Helically disposed vanes are located on the interior of said power turbine so that upon rotation thereof the vanes are forced against the cylindrically shaped power turbine support. Gases exhausting from a stationary internal combustion chamber located within the cylindrical power turbine provide the pressurized hot gases which drive the power turbine. Pressurized air from the air compressor is provided to the internal combustion chamber along with a liquid or gaseous fuel.

Further understanding of the novel turbine of this invention may be facilitated by reference to the accompanying drawings.

In the drawings,

FIG. 1 is a cross section of the entire assembly showing ignition system and combustion compounded water reclamation system by symbols.

FIG. 2 illustrates a fold-formed spacer edge on and indents in strips to be used as multiple indented helical guided passage grooves which have the same total lead per inch as grooved passages on said furnace exterior with which said helical grooves interact.

FIG. 3 is a combined impeller cover, stator and housing support providing compressed air passage to the stator intake and exhaust passages. A similar housing, without a compressed air passage is provided for power shaft bearing support and impeller cover.

FIG. 4 is an oblique projection of an assembly fragmented to show inner construction of turbine and compressor.

FIG. 5 is a fragmented oblique projection of a portion of the rotor showing the means by which the base cylinder forms closed bottoms for each centrifugal well and provides backing to which is secured the multiple formed members providing narrow helical passages between adjacent indented helical members. These indented helical members receive and transfer energy to the rotor from frictional, impact and aerodynamic forces imparted by the tangential, tornadic velocity of expanding gas on its guided way to exhaust.

The turbine comprises a stator and a rotor. The stator comprises a housing 1 and end plates 2 in combination with an internal furnace 3 and auxiliary equipment. The housing 1 is preferably of an hour-glass shape having a smaller diameter at its longitudinal mid-point than at either end. The rotor comprises a central base cylinder 4 having substantially the same length as said furnace 3 and having an impeller 5 concentrically secured at each end to a reinforced flange 6 formed on each end of said cylinder. Rectangular impeller cups and guides or wells 7 are formed around the outside of rotor base cylinder 4 and closed on bottom and sides to provide centrifugal impellers which form an air compressor unit when said rotor is whirled. Air drawn in by impellers 5 along passageways 5a flows into the cylindrical air compressor. The air converges into left and right helical passages 8 with pressure gradually increasing as air is swept in diminishing depth to collecting groove 9. The depth of helical passages 8 diminishes towards the confluence with groove 9 because of the constricting diameter of the housing 1. Compressed air flows from groove 9 through plural passages 10 formed on the outer surface of the main rotor housing and communicating with the hollow support arms 11 formed on impeller housing end plate, thence through hollow struts 12 into the air passage 13 communicating with furnace interior 14.

It is to be understood that the turbine may be constructed with only one centrifugal impeller 5 and that the air inlet of the cylindrical compressor would be at one end thereof and that the compressor air would exit at the opposite end thereof.

Plural passage tubes 15 sealably pierce some of the centrifugal wells 7 communicating between a cavity 16 formed in the drive end impeller disc 5 and a like cavity in the exhaust end impeller disc forming exhaust areas which communicate through reinforced holes 17 piercing the wall of rear stator support 18, thereby forming a means of carrying exhaust through rear impeller housing. The passageways 15 are required to provide channels for exhaust to flow from the helical discharge of the rotor on the opposite side of said rotor from said exhaust outlet 16a.

An alternative construction of the turbine can provide for single flow of exhaust gases through said helical members rather than split flow. Highly pressurized exhaust gases could enter a helix at an end opposite exhaust outlet 16a and exhaust from said helix into air exhaust cavity 16 located at the same end of the turbines as outlet 16a.

Compressed air may be drawn, for auxiliary purposes at varying stages of compression, anywhere between impellers and central collecting groove, by providing suitable openings and control valves.

A pressure pump 19 is provided to force water through tube 20 passing through exhaust manifold 18 and sealably entering and winding around interior of furnace 3. Water from the tube 20 is used for bearing cooling purposes by being directed into a cavity 21 which is a machined tubular cavity in a concentrically mounted furnace stub or pilot shaft 22, said stub pivotally engaging roller bearing means concentrically mounted on inner side of power shaft impeller disc 5 for maintaining concentric pivotal alignment between stator and rotor. Cooling steam escaping from said stub shaft cavity 21 returns to the internal combustion chamber although directed about the periphery of said chamber by a cup shaped baffle 23 formed from heat resistant metal into which the combustion flame is directed. The steam mingles with products of combustion and escapes therewith through holes 24 piercing central circumference of furnace. Furnace 3 may be of any convenient shape, however, it is preferred that the furnace be substantially cylindrical in shape having an exterior surface formed by cone frustums having their bases joined. This shape is preferred so that the depth of the diverging rotor grooves 32 will be shallow near the longitudinal mid-point of said furnace and increase as the grooves 32 approach each end of said furnace.

Helical members 26 having indents 25 therein are formed of strips of stainless steel 27 whose edges are rolled and pressed back upon the body forming a spacer 30; the other edge of said strips are run through crinkling rollers to form indents 25 and curve strips to conform to the inner surface of rotor base cylinder 4 where they are secured beginning at the center 28 and wound toward opposite ends of said cylinder in left and right threaded windings forming multiple grooves 29 having the same overall lead as the single groove lead on said furnace. Each said strip being spaced away from its adjacent strip by the thickness of its rolled edge. The crinkled indents 25, besides assisting in forming the proper curvature to said members, also serve as a myriad of buckets for the said products of combustion gas to impinge tangentially thereupon, imparting energy by impact, friction and aerodynamic forces created by action of expanding gas on the indented, curved surfaces of said helical members. The expanding combustion gases travel through diverging rotor grooves 32 and progressively converge towards the central longitudinal axis of said turbine. The crests of rotor grooves 33 and the crests of stator grooves are machined or ground to a concentric close tolerance. The lead 31 of said multiple rotor grooves being the same as the lead of the said stator grooves to provide a guided undeviating passage of expanding gas coursing to exhaust areas 16 and passages 15 out through openings 17 into the exhaust manifold and exhaust outlet 16a, thence to combustion compounded water reclamation system.

Precise alignment of the rear main bearing support and manifold assembly 18 with the impeller housing is achieved by straight key 41 (FIG. 4) fitted in grooves milled in the two said members. There is no need for high pressure packing and if packing is required in low pressure areas, labyrinth type packing 42 will suffice.

In operation, rotative power is applied to power shaft 34 by any conventional means, which turns centrifugal impellers 5 to cause air to flow through left and right helical grooves 8 about interior of turbine housing, and is continually jammed and swept along gradually converging passages to gradually increase the pressure thereof. Compressed air flows into central collecting groove 9 which has communication passages 10 to hollow support arms 11 and hollow struts 12 to inlet passage 13 and to furnace interior 14. A liquid or gas fuel is forced into furnace spray nozzle 38 through a control valve and insulated metal fuel tube passing through insulator plug seal to a spray nozzle near a fixed, grounded, combined metal electrode and hot plug 40. The fuel valve is opened and electric switch 39 is closed to conduct high tension current through insulated fuel line 36 causing a spark to jump to said grounded electrode 40 in the path of a fuel spray thereby igniting the fuel and causing the hot plug of said grounded electrode 40 to attain an elevated temperature thereby maintaining a flame as long as fuel and air are supplied to the furnace.

Combustion of fuel and air causes a greatly increased volume of gas to impinge upon the interior of said heat resistant steam and flame baffle 23, turbulently mingling fuel and air molecules to assure complete combustion and to force hot products of combustion through holes 24 which pierce the central circumference of said furnace 3. The hot combustion gases mingle with the steam flowing along the exterior of baffle 23. Baffle 23 prevents the steam from interfering with combustion prior to intermixing of the steam and combustion gases immediately prior to exhausting through said holes 24.

The combustion gases expand left and right through diverging helical grooves of the power turbine rotor, delivering energy derived from combustion to multiple helical indented and slightly spaced left and right members 26 in the manner heretofore described. The mixture of combustion gas and steam finally exhaust at greatly reduced pressure and energy to the cavities 16 formed in the two impeller discs 5 which commonly have communication through holes 17 into exhaust passage 16a after passing through exhaust manifold 18. Said steam mingling with combustion gases quickly lowers exhaust temperature creating a heat range greatly facilitating combustion compounded water reclamation and a relatively low operating temperature for the rear main bearing.

The turbine described herein has numerous advantages over conventional internal combustion turbines. Since the expanding combustion gases contact the power turbine vanes, which have a relatively large contact area because of their length, for a relatively long period of time, relatively greater power can be obtained at significantly lower revolutions per unit time. Thus, precise balance of rotating components is not as critical in the above described turbine as with conventional turbines.

The major bearings present in the above described turbine are at each end away from the hotter portions of the turbine. Shaft 22 is cooled internally by steam and the bearing surface therefor is located within impeller 5 which has a large volume of cool, intake air flowing over its surfaces.

Also a regeneration effect is achieved by having the rotor portion of the compressor as an integral part of the power turbine brings compressor air in contact with the hot cylindrical housing separating the compressor rotor vanes and the power turbine vanes. This further increases the overall efficiency of the unit.

Although the preferred embodiment of this invention is illustrated in the attached drawings, useful turbine using only a single impeller and air and gas flow from one end to the other end of the compressor and power turbine respectively can be constructed using the hereinabove described principles. External channels for conveying compressed air to a ported, hollow shaft, communicating with the internal combustion chamber would be utilized although channel 15 could be eliminated by discharging exhaust gases from the power turbine into a cavity adjacent to the exhaust outlet channel.

Moist exhaust gases may be passed through a condenser and the condensed water, after undergoing water treatment, preferably to reduce water pollutants, can be recirculated to the internal combustion furnace. The condenser may be air cooled with the heated air discharged from said condenser being introduced into one of the centrifugal air-intake impellers, further adding to the thermal efficiency of the unit. Water recirculation is frequently preferred inasmuch as limited water treatment is thereby required to maintain a low pollutant level.

Inasmuch as the power shaft 34 is attached to a centrifugal impeller and the air compressor it is generally preferred that loads be applied to the instant turbine through a fluid coupler or through a clutch and variable ratio gear arrangement.

In the conventional steam production calcium carbonate and sodium carbonate are the main pollutants but in this invention water mingling with carbondioxide would create some carbonic acid. There would be some nitrous oxide.

It is to be understood that the form herewith shown and described is to be taken as a preferred embodiment. Various changes may be made in the shape, size and arrangement of parts. For example, equivalent elements may be substituted for those illustrated and described herein and features of the invention may be utilized independently of the use of other features, all without departing from the spirit or scope of the invention as defined in the appended claims.

I claim:

1. A compact internal combustion turbine prime mover comprising:
    a. a centrifugal impeller at at least one end thereof;
    b. an outer cylindrical housing having an interior surface of conical shape;
    c. cylindrical air compressor comprising helical vanes attached to the interior of said cylindrical housing to form the stator portion of said air compressor and vanes attached to the exterior of a cylindrical rotor concentric within said cylindrical housing which forms the rotor portion of said air compressor;
    d. channel means communicating between the inlet of said cylindrical air compressor and said centrifugal impeller;
    e. a stationary internal combustion chamber;
    f. channel means communicating with the exhaust of said cylindrical air compressor and the internal combustion chamber;
    g. exhaust ports in the housing of said stationary internal combustion chamber to exhaust said hot combustion gases into a power turbine;
    h. a power turbine comprising a cylindrical housing, the exterior of which forms the rotor portion of said air compressor, and having helically disposed, indented vanes on the interior thereof to form the rotor portion of said power turbine which coacts with stator vanes disposed on the exterior of said internal combustion chamber, said power turbine being secured to said centrifugal impeller;
    i. channel means to exhaust the internal combustion gases upon their discharge from said power turbine; and
    j. a power take off shaft attached to a centrifugal impeller.

2. The turbine of claim 1 wherein a centrifugal impeller is provided at each end thereof to provide air to said cylindrical air compressor.

3. The turbine of claim 2 wherein the outer cylindrical housing has a smaller interior diameter at the midpoint of the cylindrical housing than at either end thereof.

4. The turbine of claim 3 wherein the cylindrical air compressor has means for drawing air into said compressor at either end thereof, means for moving said air towards the longitudinal mid-point thereof while simultaneously compressing said air, means for discharging said compressed air into said combustion chamber.

5. The turbine of claim 1 wherein the internal combustion chamber has a substantially cylindrical shape and the exhaust ports therein are located about the periphery of the chamber at the longitudinal mid-point thereof.

6. The turbine of claim 5 wherein the power turbine comprises means for introducing hot gases from the internal combustion chamber at the longitudinal mid-point of said cylindrical housing, means for causing said hot gases to flow from said longitudinal mid-point towards each end of said power turbine, means for permitting said gases to expand as they travel through said power turbine.

7. The turbine of claim 1 wherein the helically disposed vanes of said power turbine are centrifugally forced against the cylindrical housing of said power turbine during rotation thereof.

8. The turbine of claim 1 wherein means is provided for circulating water through said internal combustion chamber and means for discharging at least a portion of said water to cool at least one of the bearing means of said turbine and means for exhausting said steam into said power turbine.

9. The turbine of claim 2 wherein said channel means to exhaust the internal combustion gases upon their discharge from said power turbine includes means for conducting said gases through a central channel in at least one impeller.

10. The turbine of claim 9 wherein the power turbine is fixedly attached to both impellers and the power output shaft is attached to one impeller and the channel means to exhaust the internal combustion gases includes means for conducting said gases through a central channel in the opposed impeller.

* * * * *